(12) United States Patent
Rule et al.

(10) Patent No.: US 11,562,346 B2
(45) Date of Patent: *Jan. 24, 2023

(54) CONTACTLESS CARD WITH MULTIPLE ROTATING SECURITY KEYS

(71) Applicant: Capital One Services, LLC, McLean, VA (US)

(72) Inventors: Jeffrey Rule, Chevy Chase, MD (US); Srinivasa Chigurupati, Long Grove, IL (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/131,311

(22) Filed: Dec. 22, 2020

(65) Prior Publication Data
US 2021/0342819 A1 Nov. 4, 2021

Related U.S. Application Data

(63) Continuation of application No. 16/863,902, filed on Apr. 30, 2020, now Pat. No. 10,915,888.

(51) Int. Cl.
G06Q 20/34 (2012.01)
G06Q 20/38 (2012.01)

(52) U.S. Cl.
CPC ....... *G06Q 20/352* (2013.01); *G06Q 20/3823* (2013.01); *G06Q 20/3829* (2013.01)

(58) Field of Classification Search
CPC ............. G06Q 20/352; G06Q 20/3823; G06Q 20/3829; H04W 12/041; H04W 12/0431; H04W 12/069
See application file for complete search history.

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 7/2017
CN 101192295 6/2008
(Continued)

OTHER PUBLICATIONS

Yeh, Kuo-Hui, "A Secure Transaction Scheme With Certificateless Cryptographic Primitives for IoT-Based Mobile Payments," IEEE Systems Journal Year: 2018 | vol. 12, Issue: 2 | Journal Article | Publisher: IEEE.*

(Continued)

Primary Examiner — Roderick Tolentino
(74) Attorney, Agent, or Firm — Hunton Andrews Kurth LLP

(57) ABSTRACT

A contactless card can include a plurality of keys for a specific operation, e.g., encryption or signing a communication. The contactless card can also include an applet which uses a key selection module. The key selection module can select one of the plurality of keys and the applet can use the key to, e.g., encrypt or sign a communication using an encryption or signature algorithm. The contactless card can send the encrypted or signed communication to a host computer through a client device. The host computer can repeat the key selection technique of the contactless device to select the same key and thereby decrypt or verify the communication.

20 Claims, 4 Drawing Sheets

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,737,419 A | 4/1998 | Ganesan |
| 5,748,735 A | 5/1998 | Ganesan |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,850,443 A | 12/1998 | Van Oorschot et al. |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,769,060 B1 | 7/2004 | Dent et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,007,164 B1 | 2/2006 | Euchner |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,221,757 B2 | 5/2007 | Alao |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,958,362 B2 | 6/2011 | Hwang |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,161,565 B1 | 4/2012 | Langford |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |

(56) References Cited

U.S. PATENT DOCUMENTS

| | | |
|---|---|---|
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijay shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,868,911 B2 | 10/2014 | Tseng et al. |
| 8,880,027 B1 | 11/2014 | Darringer |
| 8,888,002 B2 | 11/2014 | Chesney et al. |
| 8,898,088 B2 | 11/2014 | Springer et al. |
| 8,930,274 B1 | 1/2015 | Brickell et al. |
| 8,934,837 B2 | 1/2015 | Zhu et al. |
| 8,977,569 B2 | 3/2015 | Rao |
| 8,989,390 B2 | 3/2015 | Gantman et al. |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Mathur et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,209,974 B1 | 12/2015 | Akinyele et al. |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,384,485 B1 | 7/2016 | McDonald |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,667,428 B2 | 5/2017 | Camenisch et al. |
| 9,674,705 B2 | 6/2017 | Rose et al. |
| 9,679,286 B2 | 6/2017 | Colnot et al. |
| 9,680,942 B2 | 6/2017 | Dimmick |
| 9,704,159 B2 * | 7/2017 | Pauker .............. G06Q 20/3823 |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Quern |
| 9,773,151 B2 | 9/2017 | Mil'shtein et al. |
| 9,780,953 B2 | 10/2017 | Gaddam et al. |
| 9,805,384 B2 * | 10/2017 | Chauhan ................ G06Q 20/34 |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,026,507 B2 * | 7/2018 | Cho ........................ G06F 19/00 |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,223,856 B2 * | 3/2019 | Johnson ................ G07F 7/1008 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0076042 A1 | 6/2002 | Sandhu et al. |
| 2002/0078345 A1 | 6/2002 | Sandhu et al. |
| 2002/0078353 A1 | 6/2002 | Sandhu et al. |
| 2002/0093530 A1 | 7/2002 | Krothapalli et al. |
| 2002/0100808 A1 | 8/2002 | Norwood et al. |
| 2002/0108041 A1 | 8/2002 | Watanabe et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0103276 A1 | 5/2004 | Jing et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138374 A1 | 6/2005 | Zheng et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0098824 A1 | 5/2006 | Mao |
| 2006/0136334 A1 | 6/2006 | Atkinson et al. |

(56) References Cited

U.S. PATENT DOCUMENTS

| | | |
|---|---|---|
| 2006/0159269 A1 | 7/2006 | Braun et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0013721 A1 | 1/2008 | Hwang |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0123842 A1 | 5/2008 | Pohja |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0298594 A1* | 12/2008 | Yonge, III ............ H04L 45/123 380/278 |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0144202 A1* | 6/2009 | Hurry .................... G06Q 20/12 705/67 |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1* | 4/2010 | Bertran ............ G06Q 20/35765 713/189 |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2010/0316219 A1 | 12/2010 | Boubion et al. |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0121493 A1 | 5/2013 | von Behren et al. |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |

(56) References Cited

U.S. PATENT DOCUMENTS

| | | | |
|---|---|---|---|
| 2014/0040147 A1* | 2/2014 | Varadarajan | G06Q 20/3823 705/71 |
| 2014/0047235 A1 | 2/2014 | Lessiak et al. | |
| 2014/0067690 A1 | 3/2014 | Pitroda et al. | |
| 2014/0074637 A1 | 3/2014 | Hammad | |
| 2014/0074655 A1 | 3/2014 | Lim et al. | |
| 2014/0081720 A1 | 3/2014 | Wu | |
| 2014/0138435 A1 | 5/2014 | Khalid | |
| 2014/0171034 A1 | 6/2014 | Aleksin et al. | |
| 2014/0171039 A1 | 6/2014 | Bjontegard | |
| 2014/0172700 A1 | 6/2014 | Teuwen et al. | |
| 2014/0180851 A1 | 6/2014 | Fisher | |
| 2014/0208112 A1 | 7/2014 | McDonald et al. | |
| 2014/0214674 A1 | 7/2014 | Narula | |
| 2014/0229375 A1 | 8/2014 | Zaytzsev et al. | |
| 2014/0245391 A1 | 8/2014 | Adenuga | |
| 2014/0256251 A1 | 9/2014 | Caceres et al. | |
| 2014/0258099 A1 | 9/2014 | Rosano | |
| 2014/0258113 A1 | 9/2014 | Gauthier et al. | |
| 2014/0258125 A1 | 9/2014 | Gerber et al. | |
| 2014/0274179 A1 | 9/2014 | Zhu et al. | |
| 2014/0279479 A1 | 9/2014 | Maniar et al. | |
| 2014/0325225 A1 | 10/2014 | Liu et al. | |
| 2014/0337235 A1 | 11/2014 | Van Heerden et al. | |
| 2014/0339315 A1 | 11/2014 | Ko | |
| 2014/0346860 A1 | 11/2014 | Aubry et al. | |
| 2014/0365780 A1 | 12/2014 | Movassaghi | |
| 2014/0379361 A1 | 12/2014 | Mahadkar et al. | |
| 2015/0012444 A1 | 1/2015 | Brown et al. | |
| 2015/0032635 A1 | 1/2015 | Guise | |
| 2015/0071486 A1 | 3/2015 | Rhoads et al. | |
| 2015/0088757 A1 | 3/2015 | Zhou et al. | |
| 2015/0089586 A1 | 3/2015 | Ballesteros | |
| 2015/0106622 A1 | 4/2015 | Matsuda et al. | |
| 2015/0134452 A1 | 5/2015 | Williams | |
| 2015/0140960 A1 | 5/2015 | Powell et al. | |
| 2015/0154595 A1 | 6/2015 | Collinge et al. | |
| 2015/0170138 A1 | 6/2015 | Rao | |
| 2015/0178724 A1 | 6/2015 | Ngo et al. | |
| 2015/0186871 A1 | 7/2015 | Laracey | |
| 2015/0205379 A1 | 7/2015 | Mag et al. | |
| 2015/0302409 A1 | 10/2015 | Malek | |
| 2015/0317626 A1 | 11/2015 | Ran et al. | |
| 2015/0326545 A1 | 11/2015 | Khan | |
| 2015/0332266 A1 | 11/2015 | Friedlander et al. | |
| 2015/0339474 A1 | 11/2015 | Paz et al. | |
| 2015/0371234 A1 | 12/2015 | Huang et al. | |
| 2016/0012465 A1 | 1/2016 | Sharp | |
| 2016/0026997 A1 | 1/2016 | Tsui et al. | |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0065370 A1 | 3/2016 | Le Saint et al. | |
| 2016/0087957 A1 | 3/2016 | Shah et al. | |
| 2016/0092696 A1 | 3/2016 | Guglani et al. | |
| 2016/0148193 A1 | 5/2016 | Kelley et al. | |
| 2016/0232523 A1 | 8/2016 | Venot et al. | |
| 2016/0239672 A1 | 8/2016 | Khan et al. | |
| 2016/0253651 A1 | 9/2016 | Park et al. | |
| 2016/0255072 A1 | 9/2016 | Liu | |
| 2016/0267486 A1 | 9/2016 | Mitra et al. | |
| 2016/0277383 A1 | 9/2016 | Guyomarc'h et al. | |
| 2016/0277388 A1 | 9/2016 | Lowe et al. | |
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0330027 A1 | 11/2016 | Ebrahimi | |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Schipperheijn | |
| 2017/0041759 A1 | 2/2017 | Gantert et al. | |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0295016 A1 | 10/2017 | Revell | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0205244 A1 | 7/2019 | Smith | |
| 2019/0238517 A1 | 8/2019 | D'Agostino et al. | |
| 2019/0363746 A1 | 11/2019 | Zalewski et al. | |
| 2020/0106609 A1 | 4/2020 | Osborn et al. | |
| 2020/0151311 A1* | 5/2020 | Noe | G06Q 20/385 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |

(56) References Cited

FOREIGN PATENT DOCUMENTS

| WO | WO 2016160816 | 10/2016 |
|---|---|---|
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2020/0072382 A1 | 4/2020 |

OTHER PUBLICATIONS

Pasquet et al., "Secure payment with NFC mobile phone in the SmartTouch project," 2008 International Symposium on Collaborative Technologies and Systems Year: 2008 | Conference Paper | Publisher: IEEE.*
Batina, Lejla and Poll, Erik, "SmartCards and RFID", Course PowerPoint Presentation for IPA Security Course, Digital Security at University of Nijmegen, Netherlands (date unknown) 75 pages.
Haykin M. and Wamar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8, 2013.
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018], Retrieved from Internet URL: https://squareup.com/guides/nfc, 8 pages.
Profis, S., "Everything you need to know about NFC and mobile payments" CNET Directory [online], 2014 [retrieved on Mar. 25, 2019], Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared -: or Comprehensive Confidentiality Review & Audit of GoldBug Encrypting E-Mail-Client & Secme Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV inanutshell", Technical Report, 2016 [retrieved on Mar. 25, 2019]. Retrieved from Internet URL: https://www.es.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.eom/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co-GENIE.Platform%3DDesktop&h1=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical Univer-

(56) References Cited

OTHER PUBLICATIONS sity of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON at Mamitius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
Notification of Transmittal of the International Search Report and the Written Opinion of the International Searching Authority issued in PCT/US2019/054036, dated Dec. 12, 2019.
European Extended Search Report issued in related European Patent Application No. EP 21160447.5, dated Jul. 14, 2021.

* cited by examiner

CONTACTLESS CARD WITH MULTIPLE ROTATING SECURITY KEYS

CROSS-REFERENCE TO RELATED APPLICATIONS

This application is a continuation of U.S. patent application Ser. No. 16/863,902 filed Apr. 30, 2020, the disclosure of which is incorporated herein by reference in its entirety.

BACKGROUND

Contactless cards have become very popular recently because these cards have simplified in-store and online transactions. At the same time, because of the popularity of these cards, hackers actively try to forge contactless cards to conduct unauthorized transactions. As a result, there has been a renewed focus on enhancing the security of these cards.

SUMMARY

A communication can be encrypted such that an unauthorized recipient would not be able to determine the content of the communication. There are various techniques for encrypting a communication. When using symmetric cryptographic algorithms, such as encryption algorithms, hash-based message authentication code (HMAC) algorithms, and cipher-based message authentication code (CMAC) algorithms, it is important that the key remains secret between the party that originally processes the data that is protected using a symmetric algorithm and the key, and the party who receives and processes the data using the same cryptographic algorithm and the same key.

A brute-force attack can consist of systematically checking all possible keys until the correct one is found. Hackers oftentimes use brute-force attacks to steal a key stored on a contactless card. As such, it is important that the same key is not used too many times. If a key is used or reused too frequently, that key may be compromised. Each time the key is used, it provides an attacker an additional sample of data which was processed by the cryptographic algorithm using the same key. The more data an attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key is used, the amount of side-channel data which the attacker is able to gather is limited and thereby exposure to this type of attack is reduced. Therefore, it is an object of this disclosure to implement a cryptographic system which enhances the security of a contactless card against such attacks by implementing multiple security keys. In one example embodiment, a contactless card can include a plurality of keys for a specific operation, e.g., encrypting or signing a communication. The contactless card can also include an applet which uses a key selection module. The key selection module can select one of the plurality of keys and the applet can use the key to, e.g., encrypt or sign a communication using an encryption or signature algorithm. The contactless card can send the encrypted or signed communication to a host computer through a terminal or a client device. The host computer can repeat or replicate the key selection technique of the contactless device to select the same key and thereby decrypt or verify the communication. For example, the host computer can use the same key selection module or algorithm as the contactless card. Thus, the key selection module of the host computer can select the same key as the key selected by the contactless card. Using the same key, the host computer can decrypt or verify the authenticity of the communication.

In one example embodiment, the key selection module can receive an input and select the key based on the input. The input can be provided by the contactless card or by an external device, e.g., a terminal or host computer. The key selection module can execute a mathematical algorithm or function which assigns the input to one of the keys stored on the contactless card.

In one example embodiment, a contactless card can store a plurality of encryption algorithms. Also, the contactless card can include an encryption algorithm selection module. For each encryption operation, the encryption algorithm selection module, when executed, can select one of the plurality of encryption algorithms. Using the selected encryption algorithm and a selected key, the contactless card can encrypt a communication and transmit the encrypted communication to a terminal.

Further features of the disclosed design, and the advantages offered thereby, are explained in greater detail hereinafter with reference to specific example embodiments described below and illustrated in the accompanying drawings.

DETAILED DESCRIPTION

Figure 1:
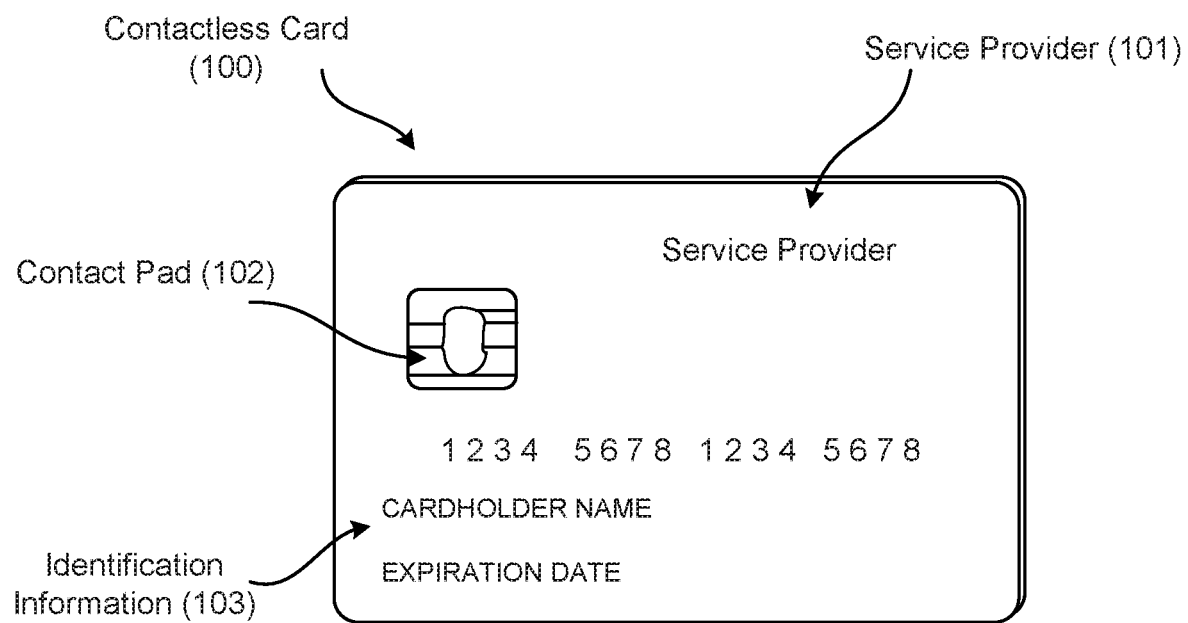
FIG. 1 illustrates a contactless card according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

A contactless card can include a substrate and processing circuitry for storing and processing information. The processing circuitry can include processors, memories, error and parity/CRC checkers, data encoders, anticollision algorithms, controllers, command decoders, security primitives and tamperproofing hardware.

The size of a contactless card can be the same as the size of a payment card, credit card or a debit card. According to ID-1 of the ISO/IEC 7810 standard, the dimensions of a contactless card can be 85.60 by 53.98 millimeters (3.37 in×2.13 in). However, a contactless card according to these disclosures can have a different size, and it is not necessary for a contactless card to be implemented in a payment card.

The storage of information can take place in a memory of the processing circuitry, which can be a read-only memory, write-once read-multiple memory or read/write memory, e.g., RAM, ROM and EEPROM. A contactless card can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory of a contactless card can be divided into several zones, each provided with a different level of security. The contactless card processor can keep track of which memory addresses belong to which zones and the circumstances under which each zone can be accessed. A contactless card processor can also process information and store the information onto the memory. In an example embodiment, a contactless card memory can be divided into four zones: a secret zone, a confidential zone, a usage zone, and a public zone.

A secret zone can be used for storage of information which can be used only by the processor itself, e.g., passwords, cryptographic keys. The information stored in this zone is not readable outside of the contactless card. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

In an example embodiment, the contactless card can be a JavaCard which can include one or more applets. The applets can be firewalled, and data can be allocated to the applet for storage. The data can be stored transactionally in an EEPROM flash memory, e.g., if the write isn't complete when the power is removed, the contents remain the same as before.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified.

A usage zone could be used for storage of information which can be periodically updated or modified. Depending on the sensitivity of the data, a password can be implemented for this zone. The usage zone can have both read and write access protected by a password.

A public zone can be used for keeping nonsensitive information, such as the card issuer's name and address. The public zone can have read-only access, without a password.

In one example embodiment, the memory of the contactless card can store a plurality of keys. These keys can be used for various operations, e.g., encryption or signing. Additionally, the contactless card can store a plurality of encryption algorithms. The memory can also store a key selection module and an encryption selection module. Using the key selection module, an applet of the contactless card can select a key for an operation of the contactless card, e.g., encryption. Using the encryption algorithm selection module, the contactless card can select an encryption algorithm to encrypt a communication.

A contactless card can wirelessly communicate with a terminal. For example, a contactless card can be a credit card including a magnetic tape or a radio-frequency identification ("RFID") tag. Some contactless cards can include both the magnetic tape and the RFID tag.

A terminal can communicate with a contactless card if the contactless card is held in proximity to the terminal. The terminal can read the contactless card over a short distance using near-field communication ("NFC") technology, which uses radio frequency induction. A contactless card can include an inductor to capture some of the incident radio-frequency interrogation signals transmitted by the terminal, rectify it, and use it to power the card's processing circuitry. As such, contactless cards can function without an internal power source. However, in some embodiments, contactless cards can include an internal power source.

The contactless card can be EMV-compliant. Europay, MasterCard and Visa ("EMV") is a payment method based upon a technical standard for smart payment cards. EMV cards can store their data on integrated circuits in addition to magnetic stripes.

The standard for contact cards can be based on ISO/IEC 7816, and the standard for contactless card can be based on ISO/IEC 14443.

FIG. 1 illustrates a contactless card 100 according to an example embodiment. In this embodiment, the contactless card 100 can be a payment card issued by a service provider 101, the name of which can be displayed on the front or back of the contactless card 100. The size of the contactless card 100 can be compliant with ID-1 of the ISO/IEC 7810 standard, i.e., 85.60 by 53.98 millimeters. The contactless card 100 can include a contact pad 102 for establishing contact with a contact terminal. The contactless card 100 can also include processing circuitry, antenna and other components not displayed in FIG. 1 (e.g., one or more microprocessors and one or more memories). These components can be located behind the contact pad 102, however, it is understood that these components can also be located elsewhere within the contactless card 100 and do not need to be located behind the contactless card 100. The contactless card 100 can also include various identification information 103 displayed on front or back of the card. The contactless card 100 can also include a magnetic strip or tape, which can be located on the back of the card.

In one example embodiment, the contactless card 100 can include a power source and a timer. The timer can be powered by the power source. The processor of the contactless card can receive a time signal from the timer, e.g., when processing transactions or encrypting messages. The processor can encrypt a message, select a key or select an encryption algorithm based on the time signal. In one example embodiment, the contactless card can receive a time signal from a terminal, client device or a host computer.

In this embodiment, the contactless card can encrypt a message or select a key based on the time signal received.

In another example, an applet of the contactless card 100 can include a counter module. The counter module can maintain a count number which can count the number of occurrences of an event. For example, the module can count the number of times the contactless card interacts with a terminal, client device or host computer. Each time the contactless card is scanned at a terminal, the processor of the contactless card can send a signal to the counter module to increment the count number.

In an example embodiment, the contactless card is provided with a radio-frequency identification ("RFID") tag. In some embodiments, the RFID tag can include processing circuitry for storing and processing information that modulates and demodulates a radio-frequency signal (usually received from a terminal, reader/writer or scanner). An RFID tag can also include an antenna for receiving and transmitting the signal. Additionally, an RFID tag can include a power source or means for collecting DC power from the incident terminal signal. These means can include modulators, voltage regulators, resets, and connections to an antenna. The antenna can be an electric dipole antenna or a coil antenna.

In an example embodiment, the coil of a contactless card can act as the secondary of an air core transformer. The terminal can communicate with the contactless card by cutting power or amplitude modulation. The contactless card can infer the data transmitted from the terminal using the gaps in the contactless card's power connection, which is functionally maintained through capacitors. The contactless card can communicate back by switching a load on the contactless card's coil or load modulation. Load modulation can be detected in the terminal's coil through interference.

A terminal can read information from a contactless card and write information onto the contactless card. In some embodiments, the terminal can pass information from the contactless card to a host computer (or server) and write information from the host computer into the contactless card. In some embodiments, the host computer can be the terminal. The terminal can provide power to the contactless card and communicatively connect the card's hardware interface to the host computer. Since the contactless card's processor can control the actual flow of information into and out of the card's memories, the terminal can operate with only minimal processing capabilities for sending the information to the host computer. In one embedment, the terminal can be a payment terminal. In other embodiments, the terminal can be a client device such as a cellphone, smart phone, laptop, desktop, wearable device, etc.

In some embodiments, the terminal can include a processor and a transceiver. The processor of the terminal can decode any data received from the contactless card. The terminal can also update, delete or modify the information stored on the contactless card.

A terminal can write data on the contactless card by passing the data to the processor of the contactless card. The processor can process the data and store it in the contactless card's memory. A terminal can have a two-way communication with a contactless card as described in ISO 14443. The contactless card can include an RFID tag. The two-way communication can be digitally encoded. There can be several frequency ranges, and several proprietary formats for the two-way communication (e.g., HID in the 125 Mhz range). The 13.56 Mhz frequency range (NFC) is dominated by ISO 14443 compatible cards.

A terminal and a contactless card can exchange messages, which can include commands or data. For example, a terminal can send a command message to the contactless card, the contactless card can process the command message in its processor and the contactless card can send back a response message to the terminal. Each of the command message and the response message can include data. A message can include TLV (Type, Length and Value) data and a command such as STORE_DATA command which prompts storage of the data included in the message in the contactless card.

Figure 2:
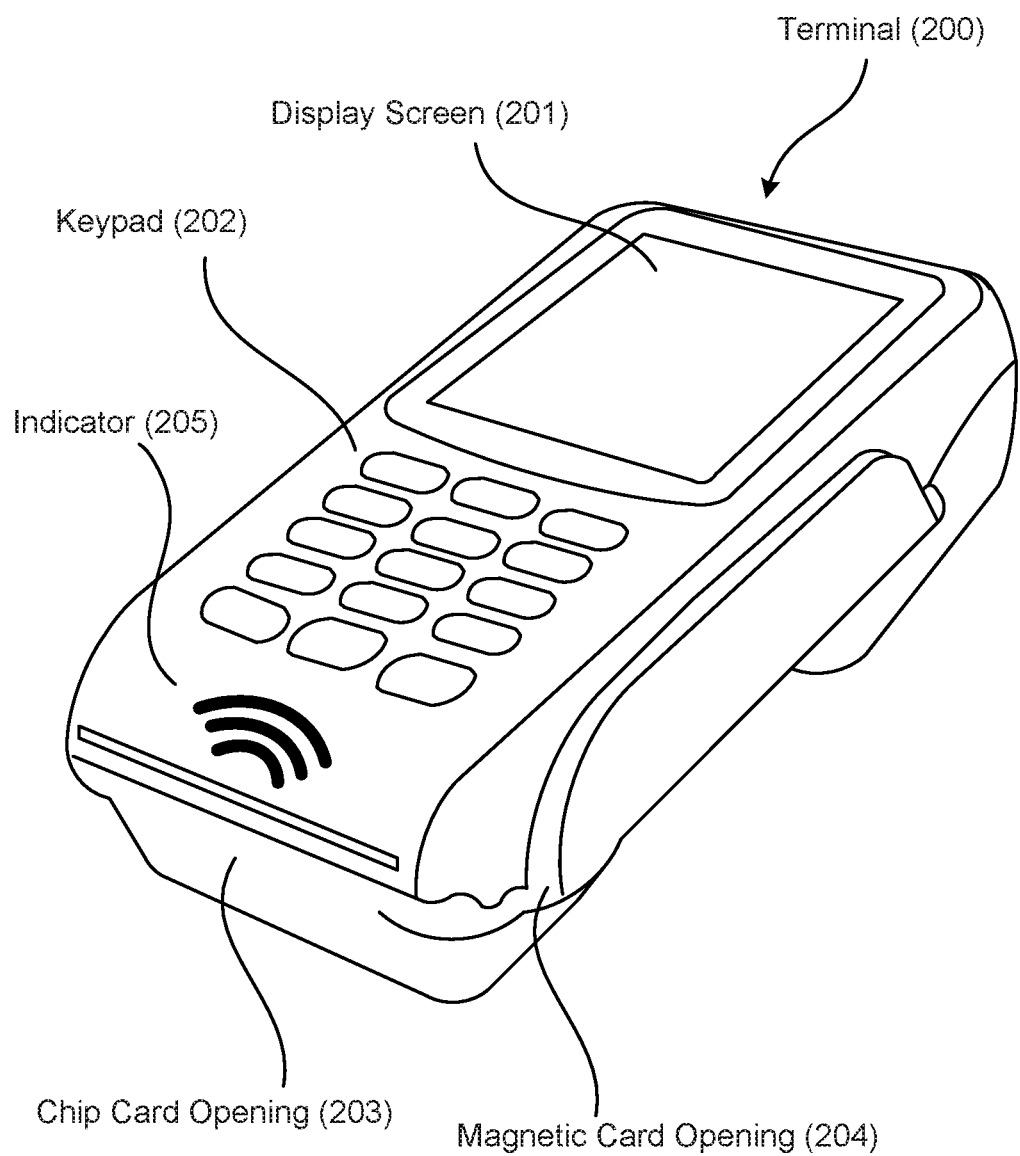
FIG. 2 illustrates a terminal or client device according to an example embodiment.

FIG. 2 illustrates a terminal 200 according to an example embodiment. In this example embodiment, the terminal 200 can include a display screen 201. This display screen can be any type of display screen, e.g., an LCD display screen. The terminal 200 can also include a keypad 202. Using the keypad 202, a customer can enter information into the terminal 200. The terminal 200 can also include an opening 203 for inserting a chip card into the terminal 200. Using the opening 203, a customer can insert a chip card into the terminal 200 so that the pins of the terminal 200 can electrically connect with the contact pad of the chip card. In some embodiments, the terminal 200 can include a magnetic card opening 204. Using the magnetic card opening 204, the customer can swipe the contactless card at the terminal 200 and the terminal 200 can obtain any information stored on the magnetic tape of the contactless card.

In an example embodiment, the terminal 200 can be a contactless RFID terminal, which can include antennas for sending and receiving signals, a transceiver, and a processor to decode data. In a passive system, the terminal can transmit an energy field that can wake up the tag and power its chip, thereby enabling it to transmit or store data. In turn, the tag converts the radio signal into usable power, and responds to the terminal in the form of a radio signal. The signal can include the tag's identity and other information. Once the terminal receives the response, the terminal converts the response and extracts any information included in the radio signal. The information collected from the tag is then transferred through a communications interface to a host computer system, where the data can be stored in a database or analyzed by the computer system. The terminal can also update, delete or modify the information stored on the contactless card.

In the example embodiment of FIG. 2, the terminal 200 is provided with one or more antennas (not displayed), which enable the device to read information from a contactless card and write information on the contactless card. The terminal 200 can include an indicator 205, which shows that the device can be contactless.

In this disclosure, the terms reader/writer, scanner, terminal and client device have been used interchangeably, and they all refer to a device which can scan a contactless card and/or write information on the contactless card.

In some embodiments, the terminal can be communicatively connected to a host computer, backend server or server. In other embodiments, the terminal can be integrated in the host computer (or server). The host computer can receive encrypted or signed communication from the contactless card (e.g., through a terminal) and can decrypt the communication or verify the communication's authenticity.

Figure 3:
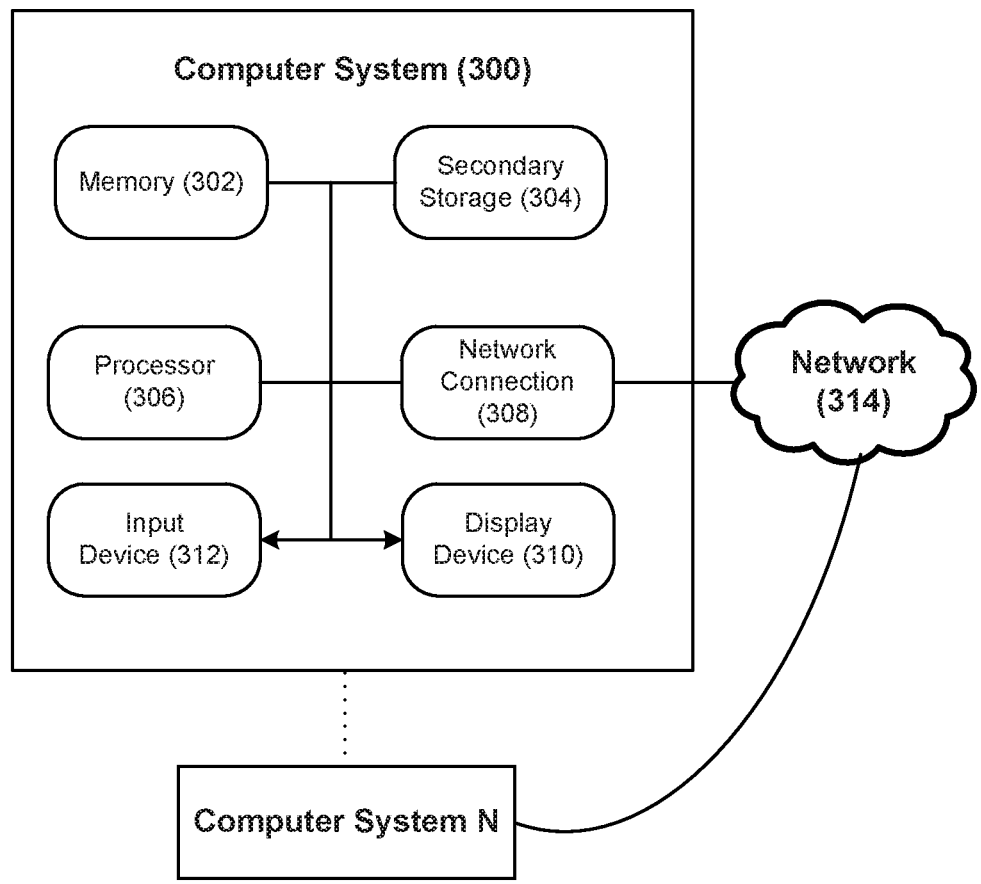
FIG. 3 illustrates exemplary hardware components for a server or host computer.

FIG. 3 illustrates exemplary hardware components of a host computer or backend server. A computer system 300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 300, may run an application (or software) and perform the steps and functionalities described above. Computer system 300 may connect to a network 314, e.g., Internet, or other network, to receive inquiries, obtain data, and transmit information and incentives as described above.

The computer system 300 typically includes a memory 302, a secondary storage device 304, and a processor 306. The computer system 300 may also include a plurality of processors 306 and be configured as a plurality of, e.g., bladed servers, or other known server configurations. The computer system 300 may also include a network connection device 308, a display device 310, and an input device 312.

The memory 302 may include RAM or similar types of memory, and it may store one or more applications for execution by processor 306. Secondary storage device 304 may include a hard disk drive, floppy disk drive, CD-ROM drive, or other types of non-volatile data storage. Processor 306 executes the application(s), such as those described herein, which are stored in memory 302 or secondary storage 304, or received from the Internet or other network 314. The processing by processor 306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 300 may store one or more database structures in the secondary storage 304, for example, for storing and maintaining the information necessary to perform the above-described functions. Alternatively, such information may be in storage devices separate from these components.

Also, as noted, processor 306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 300.

The input device 312 may include any device for entering information into the computer system 300, such as a touch-screen, keyboard, mouse, cursor-control device, microphone, digital camera, video recorder or camcorder. The input and output device 312 may be used to enter information into GUIs during performance of the methods described above. The display device 310 may include any type of device for presenting visual information such as, for example, a computer monitor or flat-screen display (or mobile device screen). The display device 310 may display the GUIs and/or output from sub-system components (or software).

Examples of the computer system 300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 300 is shown in detail, system 300 may use multiple computer systems or servers as necessary or desired to support the users and may also use back-up or redundant servers to prevent network downtime in the event of a failure of a particular server. In addition, although computer system 300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 300, to perform a particular method, such as methods described above.

In an example embodiment, a contactless card can communicate (i.e., transmit or receive) data from the host computer, e.g., through the terminal or client device. The contactless card can communicate with the terminal, e.g., using at least one of NFC, Bluetooth, RFID, Wi-Fi, and/or the like technologies. The terminal can act as an intermediary between the contactless card and the host computer, e.g., the terminal can forward a communication received from the contactless card to the host computer and vice versa. The terminal can communicate with the host computer using a network. For example, the network can include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or the like.

In some embodiments, a communication between the contactless card and the terminal can be encrypted, e.g., the communication can be encoded in such a way that only authorized parties or devices (e.g., the contactless card or the host computer) can decode or decrypt the communication. For example, the communication can be encrypted using a symmetric-key or a public-key scheme. For each one of these encryption schemes, there can be at least one key and an encryption algorithm stored on the contactless card. Similarly, an associated key and an associated encryption (decryption) algorithm can be stored on the host computer. The contactless card can encrypt a communication using the key and the encryption algorithm. The contactless card can transmit the communication to the host computer, e.g., through a client device such as a cell phone. The host computer can decrypt the communication using the associated key and associated encryption algorithm.

In an example embodiment, the encryption scheme is the symmetric-key scheme. In this example, the contactless card can store a symmetric key and an encryption algorithm. Example encryption algorithms can include Twofish, Serpent, AES (Rijndael), Blowfish, CAST5, Kuznyechik, RC4, DES, 3DES, Skipjack, Safer+/++ (Bluetooth), and IDEA. The host computer can also store a copy of the symmetric key and the encryption (or decryption) algorithm. In response to a message from the terminal, the processor of the contactless card can encrypt a communication using the symmetric key and the encryption algorithm to create a cryptogram. The contactless card can transmit the cryptogram to the terminal using a transceiver of the contactless card. The terminal can in turn transmit the cryptogram to the host computer. The host computer can decrypt the cryptogram using the symmetric key and the encryption (or decryption) algorithm.

In an example embodiment, the encryption scheme is the public-key scheme. In this example, the contactless card can store a public (or private) key and an encryption algorithm. Examples of public-key encryption algorithms include Diffie-Hellman key exchange protocol, DSS, ElGamal, Paillier cryptosystem, RSA, Cramer-Shoup cryptosystem and YAK authenticated key agreement protocol. The host computer can store a private (or public) key and the encryption (or decryption) algorithm. In response to a message from the terminal, the processor of the contactless card can encrypt a communication using the public (or private) key and the encryption algorithm to create a cryptogram. The contactless card can transmit the cryptogram to the terminal using a transceiver of the contactless card. The terminal can in turn transmit the cryptogram to the host computer. The host computer can decrypt the cryptogram using the private (or public) key and the encryption (or decryption) algorithm.

In an example embodiment, a communication between the contactless card and the host computer can include a message authentication code (MAC), a hashed message authentication code (HMAC) or a digital signature. The MAC, HMAC or digital signature can be a mathematical code or scheme which can establish authenticity of the information included in the communication. For example, when a contactless card is scanned at a terminal, the contactless card can transmit a communication to the host computer to seek authorization of a transaction. The communication can include various data, such as an account number, a name, a card security value, an expiration date and a MAC (or HMAC or digital signature). Using the MAC (or HMAC or digital signature) included in the communication, the host computer can establishes that the content of the communication is authentic (i.e., not altered). Specifically, the host computer can recreate the MAC (or HMAC or digital signature), and if the value of the MAC (or HMAC or digital signature) is the same as the MAC (or HMAC or digital signature) included in the communication, the host computer can ensure that the content of the communication is not altered. Also, the digital signature prevents (the owner of) the contactless card from denying that it transmitted the information because only the contactless card could create the MAC (or HMAC or digital signature) included with the message.

A MAC can include the following algorithms. In the first step, a key generation algorithm can generate a key. In the second step, a signing algorithm can return a tag created using the generated key and a message. In the third step, a verifying algorithm verifies the authenticity of the message given the key and the tag.

A digital signature scheme can include the following algorithms. In the first step, a key generation algorithm generates a private key and a corresponding public key. In the second step, a signing algorithm generates a digital signature using a message and a private key. In the third step, a signature verifying algorithm can verify the message using the digital signature and the public key. A MAC differs from a digital signature in that a MAC scheme uses only one key but a digital signature scheme uses two keys, i.e., a public key and a private key.

In an example digital signature scheme, the authenticity of the digital signature generated from the fixed message and fixed private key can be verified by using the corresponding public key. Moreover, these algorithms are selected such that it is computationally infeasible to generate a valid signature for a party without knowing that party's private key. This digital signature scheme can ensure authenticity of the content of a communication because if the content is digitally signed, any change in the content after signature invalidates the signature. In other words, it is practically impossible to modify the content and its signature to produce new content with a valid signature.

In an example embodiment, a contactless card can be provided with a private key and a signing algorithm. The host computer can be provided with a public key and a verifying algorithm. When a contactless card is scanned at a terminal, the contactless card can transmit a communication including a digital signature to the terminal, and the terminal can forward this communication to the host computer. The digital signature can be generated using the signing algorithm and the private key of the contactless card. The digital signature can include data such as an account number, an expiration date and a code verification value. When the host computer receives the communication, the host computer can verify the authenticity of the information included in the communication using the public key, the verifying algorithm and information included in the communication. For example, the host computer can regenerate the digital signature using the information included in the communication. If the regenerated digital signature matches the digital signature included in the communication, the host computer can verify the authenticity of the information. Otherwise, the host computer can conclude that the content of the communication is forged.

A digital signature scheme can have several advantages. For example, a hacker would be motivated to forge the content of a communication to seek authorization of a sham transaction. A digital signature can prevent this by authenticating the information included in the communication. So long as the private key associated with the contactless card is secret, the digital signature can authenticate and verify the communication.

In some example embodiments, before the content is converted into a MAC or digital signature using a signing algorithm, the message or content can be hashed. A hash function is a mathematical algorithm that maps a message of arbitrary size to a bit string of a fixed size (i.e., a hash). A hash function can be a one-way function, i.e., it is infeasible to invert the function. In an example embodiment, the MAC is built from a hash function, and thus, the product is a HMAC. In another example embodiment, the digital signature is built from a hash function.

There are several reasons to make a MAC or digital signature form hashed content as opposed to the content itself. For example, because a hash has a fixed size, the hash of the content can be shorter than the actual content, and thus, the MAC or the digital signature of the hash can be much shorter than the MAC or the digital signature of the actual content. Moreover, because it is faster to hash the content than to convert it into MAC or digital signature, it is faster to convert the hash of the content into a MAC or digital signature. In an example embodiment, the content of the contactless card is written using a HMAC.

In an example embodiment, a contactless card can include a plurality of security keys (or "keys"). For example, a contactless card can include five keys for a first operation, e.g., encryption. As another example, the contactless card can include six keys for a second operation, e.g., signing a digital signature. When the contactless card is manufactured, the manufacturer can store these keys on the contactless card. For each key stored on the contactless card, the manufacturer can also store an associated key on the host computer. In the symmetric-key scheme, each associated key can be the same as one of the keys stored on the contactless card. In the public-key scheme, a private (or public) key can be associated with one of the public (or private) keys stored on the contactless card. In one example, the card manufacturer can generate the key pairs. In another example, the key pairs can be generated by the contactless card or the host computer.

An applet of the contactless card can include a key selection module, which can select the key to be used for an operation. For example, each time the contactless card encrypts (or signs) a communication, the key selection module selects one of the keys for the encryption (or signing) operation. The key selection module can use a variety of techniques for selecting the key.

For example, the key selection module can choose the keys sequentially. In this example, for each operation requiring a key, an order can be assigned to the keys stored on the contactless card for that operation. The key selection module can select the keys in the assigned order. For example, the key selection module can select the keys based on a modular index. Once every key is used to perform the operation (e.g., encrypt or sign a communication), the key selection module can select the keys in the same order again. The order or sequence of the keys can be known to the host computer. For example, the manufacturer of the card assigned the order of the keys when the manufacturer placed the keys on the card. In this example, the manufacturer can provide the order to the host computer. As another example, the applet of the contactless card assigns the order of the keys, and the applet can communicate this order to the host computer (e.g., through a client device). As yet another example, a terminal or client device can determine the order and the terminal or client device can send the order to the contactless card and the host computer.

In an example embodiment, the key selection module can include a mathematical function or algorithm which receives an input and selects a key based on the input (e.g., the function defines a many-to-many relationship between the inputs and keys). For example, the key selection module can receive a counter number or* time signal and based on the counter number or time signal can select a key among the plurality of keys available. In this example embodiment, the host computer can also store the same key selection module (or the algorithm embedded therein) to select the keys. The host computer can also obtain the same counter number or time signal. For example, every time the contactless card is used to conduct a transaction, the counter of the contactless card increments the counter number at the contactless card and the counter of the host computer increments the count number at the host computer. This way, both the contactless card and the host computer can include the same count number when selecting the key. As another example, each of the contactless card and the host computer can include a timer. The timer can provide a time signal to the contactless card and the host computer. When both the contactless card and the host computer include the same counter number or time signal, using the key selection module, each of the contactless card and the host computer can select the same key for the operation.

As yet another example, the key selection module can select a key based on an input provided by a source outside of the contactless card. For example, the contactless card and the host computer can receive an input or signal from a terminal or client device, e.g., the input or signal can include information such as date, location coordinates of the terminal, location of the Hubble telescope, a photo of the user taken at the terminal, a number provided by the user on the terminal, etc. Based on this input, the key selection algorithm of each of the contactless card and the host computer can select a key and process a transaction.

As yet another example, the key selection module can randomly select the keys. In this example, the host computer does not know which key is selected by the contactless card. However, when the host computer receives a communication, the host computer can try all of its keys to decrypt the communication. In some examples, the key selection module can select keys based on a replaceable random selection algorithm.

As yet another example, the key selection module can select the keys based on the last transaction value conducted by the card. The contactless card can store the transaction value for the last transaction. Similarly, the host computer can store the transaction value for the last transaction. Using the transaction value, the key selection module can derive a value, which can select the key. For example, if the last transaction value for the card is $9.95, the key selection module can select a key for encryption based on the last digit of the transaction value, which here is 5. The key selection module can select the key that, e.g., is ranked as 5

As yet another example embodiment, there can be a plurality of key selection algorithms, and each algorithm can receive an input and produce an output which determines the key to be selected for an operation. In this embodiment, there can be an algorithm selection module which selects the key selection algorithm based on an input. For example, the contactless card can include two key selection algorithms, and each algorithm can use the count number to designate a key for an encryption operation. In this example, a user can provide a PIN to the client device. The client device can transmit the PIN to both the contactless card and the host computer and each device can use the PIN as an input for the algorithm selection module. Using the PIN and the algorithm selection module, each of the contactless card and the host computer can select one of the two key selection algorithms. Using the count number and the chosen key selection algorithm, each of the contactless card and the host computer can select the same key for the operation.

Figure 4:
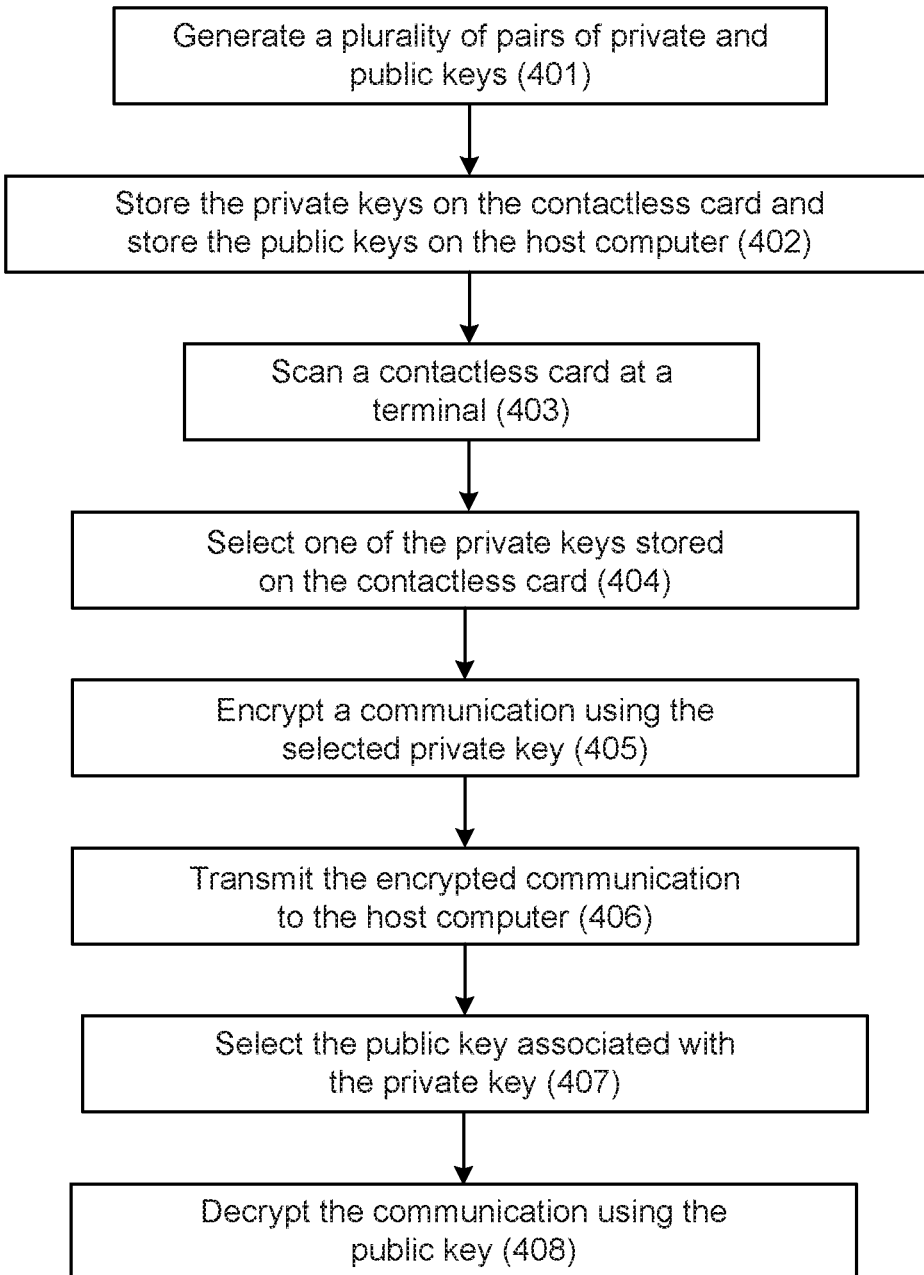
FIG. 4 shows an example flowchart for transmission of information from a contactless card to a host computer.

FIG. 4 shows an example flowchart for transmission of information from a contactless card to a host computer. In this example embodiment, a public-key scheme is implemented as the encryption technique. In step 401, a plurality of pairs of private and public keys are generated. These keys can be generated using a key generation algorithm. In step 402, the private keys are stored on a contactless card and the public keys are stored on a host computer. In step 403, a customer scans the contactless card at a terminal to request a transaction. The terminal can power up the contactless card and an applet of the contactless card can generate a communication. The communication can include an account number of the user.

In step 404, a key selection module of the applet can select one of the private keys stored on the contactless card. For example, the applet can transmit a request to the terminal to prompt the user to enter a number. In response, the user can enter the number and the terminal can transmit the number to the contactless card. The terminal can also transmit the number to the host computer. Using the number, the key selection module can select one of the private keys stored on the contactless card. In another example, the contactless card can request the terminal to transmit the terminal's location, e.g., zip code, to the contactless card. The terminal can transmit the location to the contactless card and the host computer. Based on the location, the key selection module can select one of the private keys.

In step 405, the applet can encrypt the communication using the selected private key. In step 406, the contactless card can transmit the encrypted communication to the terminal and the terminal can transmit the encrypted communication to the host computer. In step 407, the host computer can select a public key for decrypting the communication. For example, the host computer can use the number that the terminal transmitted to the host computer to select the public key. The public key can be selected using the key selection module stored on the host computer. In step 408, the host computer decrypts the communication using the public key that was selected in step 407.

In one example embodiment, the contactless card can include a plurality of encryption algorithms. The contactless card can encrypt communications or create cryptograms using each of the encryption algorithms. The contactless card can also include an encryption algorithm selection module. The encryption algorithm selection module can select one of the plurality of encryption algorithms, and the contactless card can encrypt the communication using the selected encryption algorithm. Similarly, the host computer can include the plurality of encryption algorithms and the encryption algorithm selection module. When the host computer receives an encrypted communication, using the encryption algorithm selection module, the host computer can decide which encryption algorithm use to decrypt the communication.

In one embodiment, the encryption algorithm selection module can operate similar to the algorithm selection module or key selection module discussed above, e.g., receive an input and, based on the input, select one of the plurality of encryption algorithms.

In an example embodiment, for an encryption operation, a contactless card can include ten keys and two encryption algorithms, e.g., AES and 3DES. When processing a transaction, the contactless card can receive a number input from the terminal, e.g., the user provides the number input on a keypad of the terminal. The contactless card can also store a counter number in the memory of the contactless card. The counter number can represent the number of transactions the contactless card has requested.

The contactless card can include a key selection module and an encryption algorithm selection module. The key selection module can receive the number input and, for example, based on the last digit of the number input, select one of the ten keys stored on the contactless card for the encryption operation. The encryption algorithm selection module can receive the counter number and select the AES algorithm if the counter number is even, or select the 3DES algorithm if the counter number is odd. The contactless card can create a cryptogram using a selected key and selected encryption algorithm and transmit the cryptogram to the terminal.

In one example embodiment, the contactless card can switch between a secret key OTP (or one-time password) for some transactions, and if possible, (e.g., two-way communication is possible) Public key for other transactions. As described above for various selection modules, the encryption algorithm selection module can select or switch between the two encryption schemes.

In one example embodiment, the contactless card can include a plurality of keys for a specific operation, and each time the contactless card needs to perform the operation, the key selection module can select one of the keys for the operation.

In another example embodiment, the contactless card can include a master key and a key diversification algorithm. The key diversification algorithm can generate a plurality of distinct keys using an input. In this example embodiment, for at least one of the operations on the contactless card, the contactless card can store a master key. The key selection module can provide an output to the key diversification algorithm, and, using the output, the key diversification algorithm can generate a diversified key for the master key. The contactless card can perform the operation using the diversified key, e.g., encrypt a communication. Similarly, as described above, the host computer can generate the same output using the key selection module. The host computer can also store the same key diversification algorithm and master key. Using the output, the key diversification algorithm and master key, the host computer can generate the same diversified key as the contactless card and perform an associated operation on the host computer, e.g., decrypt the communication.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A system, comprising:
 a server comprising a processor and a memory, the memory storing a first plurality of keys, a first input value, a key selection algorithm configured to select one of the first plurality of security keys based on the first input value, and a first encrypted communication from a contactless card; and
 the contactless card, wherein the contactless card comprises a card processor and a card memory, the card memory storing the first plurality of security keys, the key selection algorithm, and the first input value, and wherein the server:
  updates the first input value to derive a second input value using a first number derived from a first transaction associated with the contactless card
  selects a first selected key using the key selection algorithm and the updated input value, the first selected key being one of the first plurality of keys,
  decrypts the first encrypted communication using the first selected key to obtain a first unencrypted communication, receives a second encrypted communication from the contactless card, updates the second input value to derive a third input value using a second number derived from a second transaction associated with the contactless card, selects a second selected key using the key selection algorithm and the third input value, the second selected key being one of the first plurality of keys, and decrypts the second encrypted communication using the second selected key to obtain a second unencrypted communication.

2. The system of claim 1, wherein: the memory of the server stores a second plurality of security keys, a fourth input value, a verification algorithm, and a fifth input value; and the card memory stores the second plurality of security keys, the fourth input value, the verification algorithm, and the fifth input value, wherein the server:

receives a third encrypted communication from the contactless card through the client device, selects a third selected key using the key selection algorithm and the fourth input value, the third selected key being one of the first plurality of security keys, decrypts the third encrypted communication using the third selected security key to obtain a third unencrypted communication, selects a fourth selected key using the verification algorithm and the fifth input value, the fourth selected key being one of the second plurality of security keys, and verifies the third communication using the fifth selected security key.

3. The system of claim 2, wherein the key selection algorithm is selecting the third selected key based on the counter value.

4. The system of claim 1, wherein the first input value is a counter number and each time the contactless card is scanned at the client device, the counter number is incremented at the contactless card and the server.

5. The system of claim 1, wherein the key selection algorithm is selecting the third selected key based a time of the transaction.

6. The system of claim 1, wherein the key selection algorithm is selecting the third selected key based on a modular index.

7. The system of claim 1, wherein the first number derived from the transaction is a last digit of a total for a purchase transaction by a credit card.

8. The system of claim 1, wherein the contactless card generated the first encrypted communication using a contactless card selected key.

9. A method performed by a server comprising a processor and a memory, the memory storing a first plurality of keys, a first input value, a key selection algorithm configured to select one of the first plurality of security keys based on the first input value, and a first encrypted communication from a contactless card and a second encrypted communication from the contactless card, the method comprising:

updating the first input value to derive a second input value using a first number derived from a first transaction associated with the contactless card; selecting a first selected key using the key selection algorithm and the second input value, the first selected key being one of the first plurality of keys;

decrypting the first encrypted communication using the first selected key to obtain a first unencrypted communication;

updating the second input value to derive the third input value using a second number derived from a second transaction associated with the contactless card;

selecting a second selected key using the key selection algorithm and the third input value, the second selected key being one of the first plurality of keys; and decrypting the second encrypted communication using the second selected key to obtain a second unencrypted communication, wherein the contactless card includes a card processor and a card memory, the card memory storing the first plurality of security keys, the key selection algorithm, and the first input value.

10. The method of claim 9, wherein the third input value is a counter number and each time the contactless card is scanned at the client device, the counter number is incremented at the contactless card and the server.

11. The method of claim 9, wherein the key selection algorithm is selecting the second selected key based on the counter value.

12. The method of claim 9, wherein the key selection algorithm is selecting the third selected key based on a replaceable random selection algorithm.

13. The method of claim 9, wherein the first number derived from the first transaction is a last digit of a total for a purchase transaction by a credit card.

14. The method of claim 9, wherein the contactless card generated the first encrypted communication using a contactless card selected key.

15. A contactless card, comprising:

a memory containing one or more applets, a counter value, a plurality of keys, and a key selection algorithm configured to select one of the first plurality of keys based on the counter value;

a transceiver; and a processor in communication with the memory and the transceiver, wherein the processor:

increments the counter value when the transceiver is within a range of a communication field of a client device, selects a first selected key using a key selection algorithm stored on the memory, generates a communication, encrypts the communication using the first selected key to obtained an encrypted communication, and transmits, via the transceiver, the encrypted communication to the client device.

16. The contactless card of claim 15, wherein the key selection algorithm is selecting the first selected key based on an assigned order.

17. The contactless card of claim 15, wherein the key selection algorithm is selecting the first selected key randomly.

18. The contactless card of claim 15, wherein the key selection algorithm is selecting the first selected key based on a transaction value for the last transaction conducted by the contactless card.

19. The contactless card of claim 15, wherein: the contactless card further comprises a timer configured to provide a time signal to the processor, and the processor selects the first key based on the time signal.

20. The contactless card of claim 15, wherein: the memory further contains a plurality of key selection algorithms, the contactless card further comprises a timer configured to provide a time signal to the processor, and the processor selects the key selection algorithm from the plurality of key selection algorithms based on the time signal.

\* \* \* \* \*